United States Patent
Johnstad

(10) Patent No.: US 9,176,254 B2
(45) Date of Patent: Nov. 3, 2015

(54) ELECTROMAGNETIC AND SEISMIC STREAMER CABLE AND METHOD FOR USING SUCH A STREAMER CABLE

(75) Inventor: Svein Erling Johnstad, Bønes (NO)

(73) Assignee: MULTIFIELD GEOPHYSICS AS, Laksvag (NO)

( * ) Notice: Subject to any disclaimer, the term of this patent is extended or adjusted under 35 U.S.C. 154(b) by 436 days.

(21) Appl. No.: 13/002,623

(22) PCT Filed: Mar. 16, 2009

(86) PCT No.: PCT/NO2009/000097
§ 371 (c)(1),
(2), (4) Date: Feb. 23, 2011

(87) PCT Pub. No.: WO2010/002263
PCT Pub. Date: Jan. 7, 2010

(65) Prior Publication Data
US 2011/0158043 A1    Jun. 30, 2011

(30) Foreign Application Priority Data

Jul. 4, 2008 (NO) .................................. 20083018

(51) Int. Cl.
G01V 11/00 (2006.01)
G01V 1/20 (2006.01)
G01V 3/08 (2006.01)
G01V 3/12 (2006.01)

(52) U.S. Cl.
CPC ............... *G01V 11/00* (2013.01); *G01V 1/201* (2013.01); *G01V 3/083* (2013.01); *G01V 3/12* (2013.01); *G01V 2210/6163* (2013.01)

(58) Field of Classification Search
CPC ....... G01V 11/00; G01V 1/201; G01V 3/083; G01V 3/12

USPC ................................................ 367/17, 18, 16
See application file for complete search history.

(56) References Cited

U.S. PATENT DOCUMENTS

| | | | | |
|---|---|---|---|---|
| 4,617,518 | A * | 10/1986 | Srnka | 324/365 |
| 6,456,565 | B1 * | 9/2002 | Grall et al. | 367/18 |
| 7,403,448 | B2 * | 7/2008 | Welker et al. | 367/17 |
| 7,453,763 | B2 * | 11/2008 | Johnstad | 367/20 |
| 7,671,598 | B2 * | 3/2010 | Ronaess et al. | 324/365 |
| 8,008,921 | B2 * | 8/2011 | Alumbaugh et al. | 324/365 |
| 2004/0108854 | A1 | 6/2004 | Nichols | |
| 2006/0238200 | A1 * | 10/2006 | Johnstad | 324/337 |
| 2007/0294036 | A1 | 12/2007 | Strack et al. | |
| 2008/0192569 | A1 * | 8/2008 | Ray et al. | 367/15 |
| 2008/0265895 | A1 * | 10/2008 | Strack et al. | 324/347 |

FOREIGN PATENT DOCUMENTS

| | | | |
|---|---|---|---|
| GB | 2 395 273 | A | 5/2004 |
| GB | 2 421 800 | B | 12/2007 |
| GB | 2443842 | A * | 5/2008 |

* cited by examiner

*Primary Examiner* — Isam Alsomiri
*Assistant Examiner* — Hovhannes Baghdasaryan
(74) *Attorney, Agent, or Firm* — Patent Portfolio Builders PLLC

(57) ABSTRACT

A geophysical sensor cable has one or more sensor cable sections. Each of the sensor cable sections is provided with seismic and electromagnetic sensors arranged along said cable. The seismic sensors include a hydrophone and a seismic component receiver for seismic vector measurements while the sensor cable is at the sea-floor. The electromagnetic sensors include both E-field sensors and H-field sensors. The E-field sensors include pairs of first and second electrodes arranged with different positions along the cable and connected to a voltage amplifier. The H-field sensors include three mutually orthogonally arranged H-field component sensors.

20 Claims, 3 Drawing Sheets

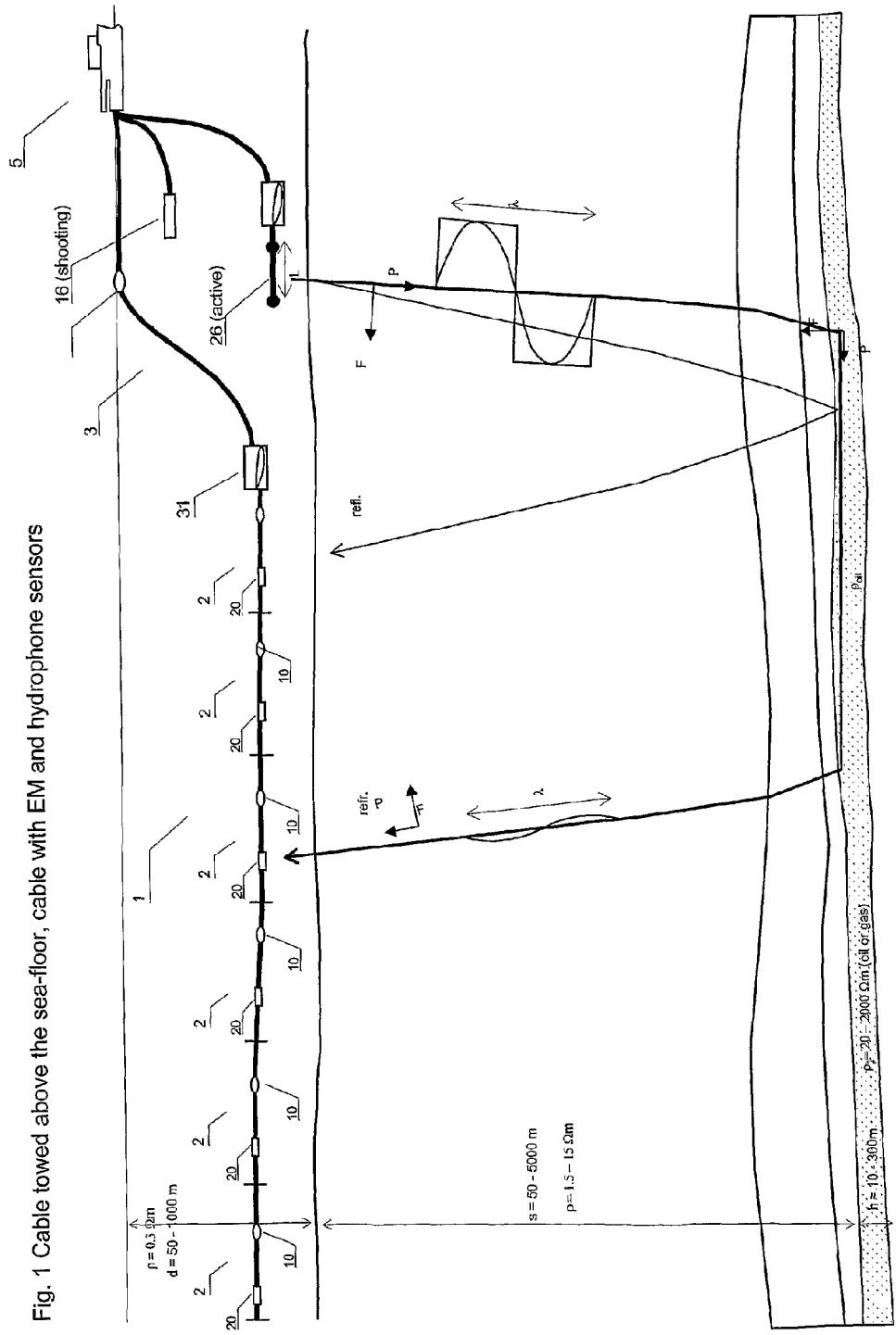
Fig. 1 Cable towed above the sea-floor, cable with EM and hydrophone sensors

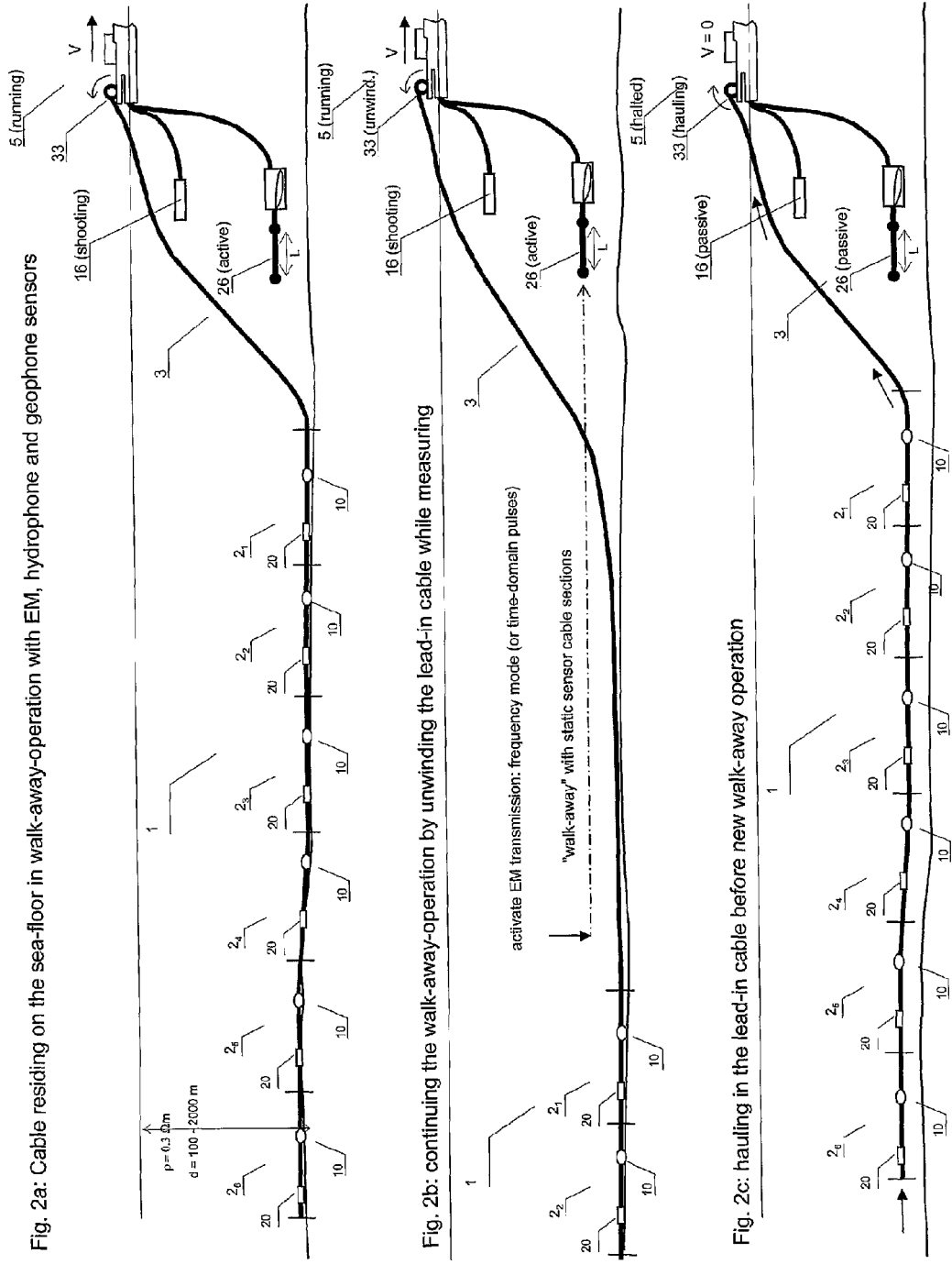

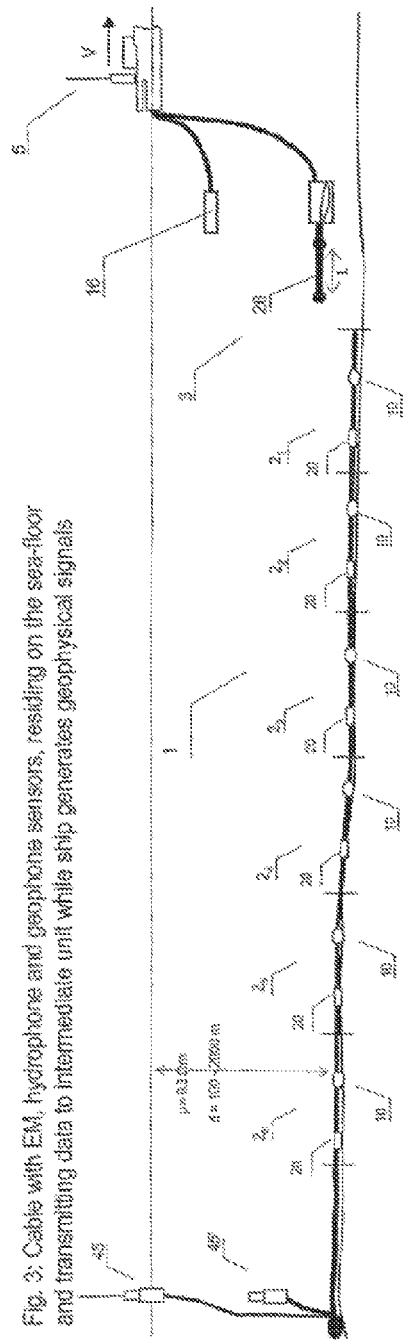
Fig. 3: Cable with EM, hydrophone and geophone sensors, residing on the sea-floor and transmitting data to intermediate unit while ship generates geophysical signals
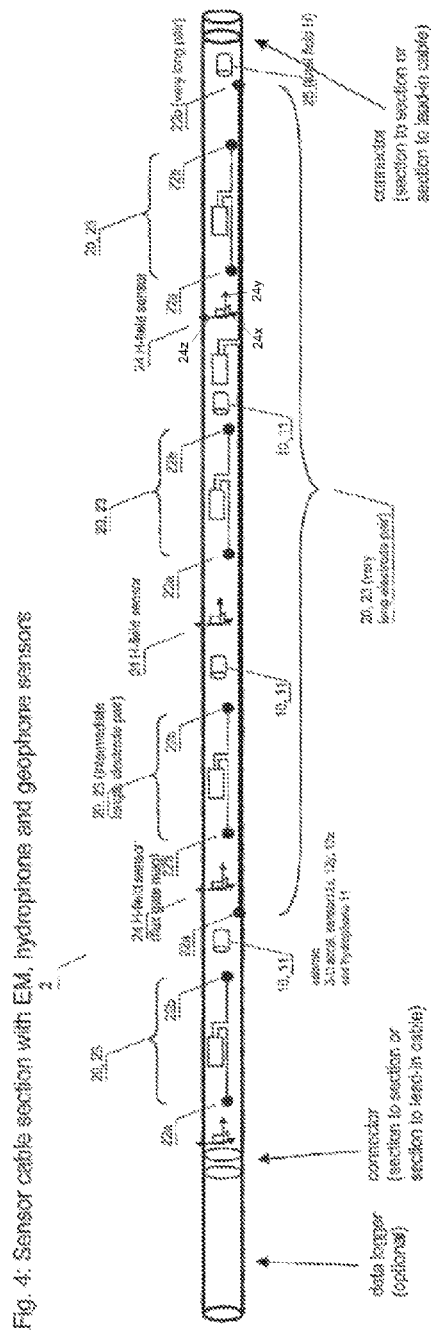
Fig. 4: Sensor cable section with EM, hydrophone and geophone sensors

ELECTROMAGNETIC AND SEISMIC STREAMER CABLE AND METHOD FOR USING SUCH A STREAMER CABLE

INTRODUCTION

The present invention relates to marine geophysical prospecting. More specifically the invention relates to a marine geophysical streamer in the form of a submersible cable with seismic, i.e. acoustic and seismic component sensors and electromagnetic sensors arranged along the cable. The cable is preferably made in sensor cable sections of generally identical construction. The sensor cable sections may be connected from a first sensor cable section rear end to fore end to a subsequent sensor cable section or a series of subsequent sensor cable sections to form a long sensor cable for collecting seismic and electromagnetic data in the sea or at the sea-floor.

BACKGROUND ART

A combined seismic and electromagnetic marine streamer is disclosed in GB2421800 Johnstad. The UK patent describes a system of a seismic source in the sea providing seismic signals propagating to be picked up in acoustic sensors arranged along the streamer cable, and an electromagnetic source analogically emitting electromagnetic waves for being picked up at electromagnetic sensors arranged along the same streamer cable.

Due to towing of the cable through the sea, the water turbulence formed by the streamer cable running through the water gives rise to acoustic noise. Similarly, the fact that mutually electrically connected electrodes are towed through the geomagnetic field in the sea will induce an electrical voltage to be considered as noise with respect to CSEM data acquisition. Further, the fact that the electrodes move through ion-containing water will also induce electrical noise in the measured data.

The propagating electromagnetic field will be a wave with two components, an electrical field component E and a magnetic field component H which is orthogonal to this electrical field. The magnitude of the components depends on the electromagnetic impedance Z in the medium of which the wave propagates. In marine CSEM-geophysical prospecting an EM source is usually arranged in the sea and the EM field will propagate partly downward through the sea-floor and through the rocks, and will be reflected or refracted back to the surface and may be detected by EM-sensors in the sea. The direction of propagation along a Poynting vector $P=E \times H$ may be determined by the mutual angles of the components. Thus the direction of propagation of the electromagnetic wave may be used for wavefield separation purposes in order to separate an upcoming field from the underground, which is relevant for geophysical measurements, from a downwards propagating field which may be due to an undesired air wave or a reflection from the sea surface. The relative size of the E- and H-fields as measured in the sea may also be used for calculating the electromagnetic impedance of the seafloor and the geological layers below the sea-bed.

Thus it is relevant to use an EM-sensor cable which can measure both the in-line E field and a cross-line H-field relative to the cable. At the same time it is useful to have integrated acoustic sensors in the cable in order to collect both EM and seismic measurements simultaneously. This saves time and money and provides improved correlation according to GB2421800.

BRIEF DESCRIPTION OF THE DRAWINGS

The invention is illustrated in the accompanying drawings.

FIG. 1 illustrates in a vertical section and side view of the sea and the sea-floor, a sensor cable according to the invention being towed above and along the sea-floor, the cable with EM and hydrophone sensors. The towing ship also tows a seismic signal source and a controlled electromagnetic source in the sea. Particularly the EM-source may be depth controlled by a so-called source depressor fish. EM-signal paths, both refracting and reflecting, down to a high-resistivity geological layer are illustrated.

FIG. 2a shows a ship with a sensor cable of the invention conducting the beginning parts of a so-called walk-away operation, unwinding a lead-in cable from the ship to the cable residing on the sea-floor while the ship is running to increasing offsets with the signal sources. The EM signal source may operate in either frequency mode or in time domain.

FIG. 2b illustrates the ship having run for a while in the walk-away operation.

FIG. 2c illustrates the ship hauling in the lead-in cable and the sensor cable. In such a hauling-in operation the sensor cable may be lifted from the sea-floor.

FIG. 3 shows a sensor cable with EM, hydrophone and geophone sensors, the cable residing on the sea-floor and transmitting data to an intermediate unit while ship generates geophysical signals. The intermediate unit 45 or 45' may collect the data for subsequent data analysis, or relay the measurements via radio transmission to the ship or another data acquisition unit at the surface.

FIG. 4 illustrates a sensor cable section according to the invention, the sensor cable section provided with EM, hydrophone and geophone sensors as described below. A connector to a lead-in cable or a data logger (or a preceeding sensor cable section) may be arranged in a fore end of the sensor cable section, and a connector to a trailing cable section may be arranged in a rear end. The sensor cable section may be arranged as a cable with sensor nodes, or a streamer cable provided with a skin such as used for ordinary seismic streamer cable. The sensor cable may be provided with sensor nodes. The sensor cable may also be constitute by a rigid streamer pipe provided with sensors.

SUMMARY OF THE INVENTION

The invention is a marine geophysical sensor cable (1) comprising one or more sensor cable sections (2),
  one or more of said sensor cable sections (2) provided with seismic and electromagnetic sensors (10, 20) arranged along said cable (1),
said seismic sensors (10) comprising one or more hydrophones (11) and one or more seismic component receivers (12) for seismic vector measurements, said electromagnetic sensors (20) comprising both E-field sensors (22) and H-field sensors (24) arranged for measuring one or more H-field components.

In an advantageous embodiment of the invention, the E-field sensors (22) are arranged for measuring an electrical field in a direction parallel to said streamer cable (1) when towed in the sea.

In a further embodiment of the invention the E-field sensors (22) comprise pairs of first and second electrodes (22a, 22b) arranged with different positions along the cable (1) and connected to a voltage amplifier (23).

In a further advantageous embodiment of the invention the sensor cable's one or more H-field component sensors (24) are arranged for sensing orthogonally to said E-field sensors (22). Having two or more H-field sensors (24) arranged sensing at an angle to each other may provide directional information in addition to measuring field arising from the CSEM-source. Most preferably the H-field sensors (24) comprise three mutually orthogonally arranged H-field component sensors (24x, 24y, 24z) which provide a total image of the magnetic fields composed of the local geomagnetic field and the varying CSEM-magnetic field.

DESCRIPTION OF EMBODIMENTS OF THE INVENTION

The invention is a marine geophysical sensor cable (1) comprising one or more sensor cable sections (2). Each of said sensor cable sections (2) is provided with seismic and electromagnetic sensors (10, 20) arranged along said cable (1), please see FIG. 1. The seismic sensors (10) comprise a hydrophone (11) and one or more seismic component receivers (12), please see FIG. 4, the seismic component receivers (12) for use for seismic vector measurements while said sensor cable (1) being at the sea-floor, such as illustrated in FIG. 2a and FIG. 2b. The electromagnetic sensors (20) comprise both E-field sensors (22) and H-field sensors (24). The E-field sensors (22) comprise pairs of first and second electrodes (22a, 22b) arranged with different positions along the cable (1) and connected to a voltage amplifier (23), please see FIG. 4. The H-field sensors (24) comprise one or more, preferably three mutually orthogonally arranged H-field component sensors (24x, 24y, 24z).

In an embodiment of the invention, the sensor cable of the invention, the seismic component receivers (12) comprise three mutually orthogonally arranged seismic component sensors (12x, 12y, 12z). Such an arrangement of seismic sensors will enable measurements of seismic waves of any direction. The seismic component receivers (12) component sensor (12x, 12y, 12z) may be accelerometers or so-called geophones.

The sensor cable according to the invention may have H-field sensors (24) comprising at least one H-field component sensor to detect the cross-field associated with the in-line E-field, preferably two or three mutually orthogonally arranged H-field component sensors (24x, 24y, 24z). The H-field component sensors found most useful for the purpose are so-called flux-gate magnetometers (24x, 24y, 24z). Advantageously, the sensor cable (1) of the invention with said H-field sensors (24) further comprises a total field magnetometer (25).

In an embodiment of the invention, one of said cable sections (2) in the sea is provided with a lead-in cable (3) extending to a ship (5), please see FIGS. 1 and 2. The lead-in cable (3) may be provided with a so-called depressor fish (31) arranged for submerging at least a fore end of said sensor cable (1) to a desired depth while said sensor cable (1) being towed in the sea.

In an embodiment of the invention the lead-in cable (3) is arranged on a drum (33) on the ship and arranged for being wound out from the ship (5) during so-called walk-away operations with said cable (1) arranged statically with respect to the sea-floor during electromagnetic data acquisition, such as illustrated in FIGS. 2b and 2c. During data acquisition the sensor cable sections are allowed to settle to the sea-floor while the lead-in cable is unwound at a speed similar to the ship's speed, and while electromagnetic signals are measured by the sensor cable sections sensors while residing on the sea-floor. This will reduce the overall noise at the sensors, particularly, it will significantly reduce electromagnetic towing noise. It will also advantageously reduce the noise level in the seismic sensors. After having sent out seismic and EM-signals for a desired offset range, the ship may haul in all or part of the lead-in cable and pull the sensor cable sections to a new desired position, and start a new EM and seismic data acquisition walk-away leg.

The ship (5) towing the sensor cable (1) may according to one embodiment also be the ship (5) arranged for towing an electromagnetic signal source (26). This will in most instances be the most economical process. Further, the ship operating the sensor cable (1) of may be arranged for towing a seismic signal source (16). Alternatively, separate seismic and/or EM-signal source-operating ships may be used.

In one embodiment the H-field component sensors are so-called flux-gate magnetometers which measure the magnetic field component along the sensor axis of the flux-gate. Such flux-gate magnetometers thus may provide a good measurement of the field component and its direction, but the measurement may be noisy with regard to amplitude. On the other hand, total field magnetometers, i.e. magnetometers that do not measure the direction but only the magnitude of the field, may provide a better resolution at least better than about 2 nT, with a reading rate of several readings per second and should thus be capable of following the CSEM signal frequency which may be between 10 Hz and down to 0.01 Hz or lower frequency. The geomagnetic field may vary between 25000 nT to 70000 nT. One such kind of total field magnetometer is a so-called proton magnetometer. A total field magnetometer may be used in the sensor cable to calibrate the orthogonally arranged flux-gate magnetometers in the sensor cable by comparing the vector sum of the three orthogonal amplitudes of the flux-gate magnetometers with the total field, and correcting their amplitudes. Further, due to the fact that the direction of the geomagnetic field is generally known, the orthogonally arranged magnetic field component sensors may be used to orient the measurements for nearby sensors in the sensor cable having the same relative orientation.

Walkaway

The streamer cable (1) of the invention is provided with a so-called lead-in cable (4) extending from a fore part of said streamer cable (1) to a ship (5). In a preferred embodiment of the invention the lead-in cable (3) arranged on a drum (33) on the ship (1) and for being fed out from the drum at generally the same speed as the ship's speed, and the sensor cable sections (2) are allowed to settle and halt at the sea-floor while measuring, while the ship tows the controlled EM-source (26) to increasing offsets. The ship may simultaneously tow the acoustic source (16) while shooting at predetermined offsets. Irrespective of which source is used this is a so-called walk-away operation.

Cable Buoyancy

Due to the EM-signal loss particularly in the sea-water and further in the sea-floor both to the downgoing signal from the source and the upcoming signal to the sensors it is important to keep the EM-source, the EM-sensors, or both, near the sea-floor. The sensor cable sections (2) may be made of a flexible hose or pipe comprising all power and signal cables, electrode-to-amplifier connecting wires, and amplifiers. It is believed that a pipe may provide reduced towing noise compared to a hose. The flexible hose or pipe may be filled with a gel to provide a desired buoyancy, either positive, neutral or negative. In a preferred embodiment for use with the walk-away operation the buoyancy of the sensor cable sections may be slightly increased. Increasing the weight of the sensor cable sections may be done by increasing the density of the gel and/or attaching non-magnetic weights to the sensor cable sections. In an embodiment for use with seismic component sensors (10) of which mechanical contact between the seismic component sensor housing and the sea-floor is important, particularly for the cross-line acceleration measurements, the seismic component sensor housing may be provided with clamp-on half-shell weights which preferably are disconnectable. For use as a towed sensor cable section (2) during the data acquisition the buoyancy may be adjusted to neutral either by changing the gel to a lighter density or removing the weights so as for the sensor cable sections (2) to be towed at a desired height over the sea-floor guided by a so-called depressor fish (31) on the lead-in cable (3).

E-Field Sensors

A sensor cable section (2) may comprise one very long E-field electrode pair of two electrodes (22a, 22b) connected by connecting wires to an amplifier (23), the electrodes (22a, 22b) having 100-500 m electrode centre-centre separation. Such a pair of electrodes (22a, 22b) may cover the entire available length of a sensor cable section (2). In a preferred embodiment the electrode-electrode separation is 200 to 300 m—most preferably 250-275 meters. Further, the sensor cable section (2) may comprise several intermediate-length E-field electrode pairs (22a, 22b) having a centre-centre electrode separation of 16 to 80 m, preferably 20-50 m, most preferably 24-32 meters. Depending on the length of the sensor cable section (2) the number of such intermediate-length E-field electrode pairs (22) may be three to six.

Seismic Sensors

The above-mentioned seismic component sensors (12) comprise three mutually orthogonally arranged seismic sensors (12x, 12y, 12z) such as accelerometers so as for enabling seismic acceleration vector measurements with the sensor cable (1) arranged at statically at the sea-floor. The three orthogonally arranged seismic sensors (12x, 12y, 12z) may also be so-called geophones. The geophones may provide seismic velocity measurements. The hydrophone, sensing the pressure due to seismic waves, may be arranged in the same housing as the geophones so as for measuring acoustic pressure variations. Further, each seismic node may comprise a depth sensor for use in both sea-floor operations where it is important to know when the cable section has settled to the sea-floor, but also for providing feedback about the current depth of each portion of the sensor cable sections (2) during towing operations for EM and seismic data acquisition, the depth measurements both for correcting the sensor depth to a desired depth, and the depth for use during both EM and seismic data analysis.

The invention will allow simultaneous measurements of electromagnetic E-fields and H-fields at or near the sea-floor, and thus provide a valuable improvement of the possibilities of wavefield separation due to the fact that upwards- and downwards-propagating EM-fields may be discriminated. Further, embodiments of the invention will allow walk-away operations reducing particularly the electromagnetic noise associated with particularly E-field sensors otherwise moving in a conductive medium and in a magnetic field.

The invention claimed is:

1. A marine geophysical streamer, comprising:
one or more sensor cable sections connected to one another and configured to have adjustable buoyancy enabling said one or more sensor cable sections to be placed stationary on the sea-floor at different survey positions and to be towed between the survey positions during a marine survey;
seismic and electromagnetic sensors arranged along said sensor cable sections and configured to detect seismic and electromagnetic waves while said one or more sensor cable sections are placed stationary on the sea-floor; and
a lead-in cable having a first end attached to the sensor cable sections and a second end on a continuously moving ship, the lead-in cable being extended while said one or more sensor cable sections are stationary on the sea-floor, and shortened while said one or more cable sections are towed from one of the survey positions to another of the survey positions.

2. The streamer of claim 1, said lead-in cable being provided with a depressor fish arranged for submerging a fore end of said one or more sensor cable sections to a desired depth.

3. The streamer of claim 1, wherein said lead-in cable is wounded on and out of a drum onboard a ship to be extended and shortened, respectively.

4. The streamer of claim 1, wherein said lead-in cable is fed out at a rate matching a towing speed of an electromagnetic source or a seismic source moving away from said one or more sensor cable sections placed stationary on the sea-floor, the electromagnetic source or the seismic source being towed by the ship.

5. The streamer of claim 1, wherein each of said one or more sensor cable sections includes a depth sensor configured to supply depth information while the one or more sensor cable sections are stationary and while the one or more cable sections are towed.

6. The streamer of claim 1, wherein
said electromagnetic sensors comprising E-field sensors and H-field sensors arranged for measuring one or more electromagnetic field components.

7. The streamer of claim 6, having said E-field sensors arranged for measuring a field in a direction parallel to said streamer when towed in the sea.

8. The streamer of claim 6, said E-field sensors comprising pairs of first and second electrodes arranged with different positions along the streamer and connected to a voltage amplifier.

9. The streamer of claim 6, said one or more H-field component sensors being arranged to sense orthogonally to said E-field sensors.

10. The streamer of claim 6, said H-field sensors comprising three mutually orthogonally arranged H-field component sensors.

11. The streamer of claim 10, said H-field component sensors being flux-gate magnetometers.

12. The streamer of claim 6, said H-field sensors further comprising a total field magnetometer.

13. The streamer of claim 6, wherein the E-field sensors in one of said sensor cable sections include two pairs of electrodes, electrodes of each pair being arranged at different positions along the streamer, at a 16-80 m separation between electrode centers, the two pairs of electrodes being arranged along a same one of said one or more sensor cable sections.

14. The streamer of claim 13, wherein the E-field sensors further include a long E-field sensor having two electrodes arranged at different positions along the one of said sensor cable sections, at a 100-500 m separation between electrode centers.

15. The streamer of claim 1, wherein
said seismic sensors comprising a hydrophone and one or more seismic component receivers for seismic vector measurements.

16. The streamer of claim 15, said seismic component receivers comprising three mutually orthogonally arranged seismic component sensors.

17. The streamer of claim 16, said seismic component receivers being accelerometers.

18. The streamer of claim 16, said seismic component receivers being geophones.

19. A marine geophysical survey system comprising:
a ship configured to tow at least one of an electromagnetic source and a seismic signal source; and
a streamer having
one or more sensor cable sections connected to the ship and configured to have an adjustable buoyancy enabling said one or more sensor cable sections to be towed and to be placed stationary on the sea-floor at different survey positions and to be towed between the survey positions during a marine survey; and
seismic and electromagnetic sensors arranged along said sensor cable sections and configured to detect seismic and electromagnetic waves while said one or more sensor cable sections are placed stationary on the sea-floor,
wherein said ship tows the electromagnetic source or the seismic source continuously, while the one or more sensor cable sections are stationary on the sea-floor and while said one or more cable sections are towed from one of the survey positions to another of the survey positions.

20. A method for acquiring seismic and electromagnetic data related to a geological structure under sea-floor, the method comprising:
placing a streamer carrying seismic and electromagnetic sensors configured to detect seismic and electromagnetic waves, at a first survey position on the sea-floor;
acquiring seismic and electromagnetic data while the streamer is stationary at the first survey position;
towing the streamer between the first survey position and a second position on the sea-floor; and
towing continuously a seismic source and an electromagnetic source, while said streamer is stationary on the sea-floor and while said streamer is towed,
wherein said seismic sources and said streamer are towed by a same ship.

* * * * *